United States Patent [19]
Farnsworth et al.

[11] Patent Number: 4,911,195
[45] Date of Patent: Mar. 27, 1990

[54] VALVE BLOCK ASSEMBLY

[75] Inventors: Vincent R. Farnsworth, Agoura; Paul K. Cartier, III, Arcadia, both of Calif.

[73] Assignee: Porton Instruments, Inc., Tarzana, Calif.

[21] Appl. No.: 205,772

[22] Filed: Jun. 13, 1988

Related U.S. Application Data

[63] Continuation-in-part of Ser. No. 901,327, Aug. 27, 1986, Pat. No. 4,773,446.

[51] Int. Cl.$^4$ .............................................. B67D 5/54
[52] U.S. Cl. .................................... 137/208; 137/212; 137/606; 137/613
[58] Field of Search ............... 137/606, 208, 209, 212, 137/859, 588, 597, 266, 613; 251/61.1, 331

[56] References Cited

U.S. PATENT DOCUMENTS

| | | | |
|---|---|---|---|
| 283,247 | 8/1883 | Hull | 137/208 |
| 932,284 | 8/1909 | Jones | 137/266 X |
| 2,620,106 | 12/1952 | Weeks et al. | 137/208 |
| 4,304,257 | 12/1981 | Webster | 251/331 X |
| 4,520,950 | 6/1985 | Jeans | 137/212 |
| 4,541,452 | 9/1985 | Paradis | 137/209 |
| 4,703,913 | 11/1987 | Hunkapiller | 251/61.1 |

Primary Examiner—Stephen M. Hepperle
Attorney, Agent, or Firm—Iver P. Cooper

[57] ABSTRACT

A valve block assembly with internal delivery channels and a common outlet channel is provided. Access of reactants to the delivery channels is controlled by diaphragm valves, preferably equipped with relief grooves to accommodate deformation of the diaphragm. Reservoirs feeding the delivery channels have an inert atmosphere controlled by pressurizing and venting channels in the valve block. Exposure of plastic tubing to oxygen is kept to a minimum. The assembly is particularly adapted for use in a DNA or protein sequencer to supply reactants without cross-contamination or oxidative decomposition.

1 Claim, 7 Drawing Sheets

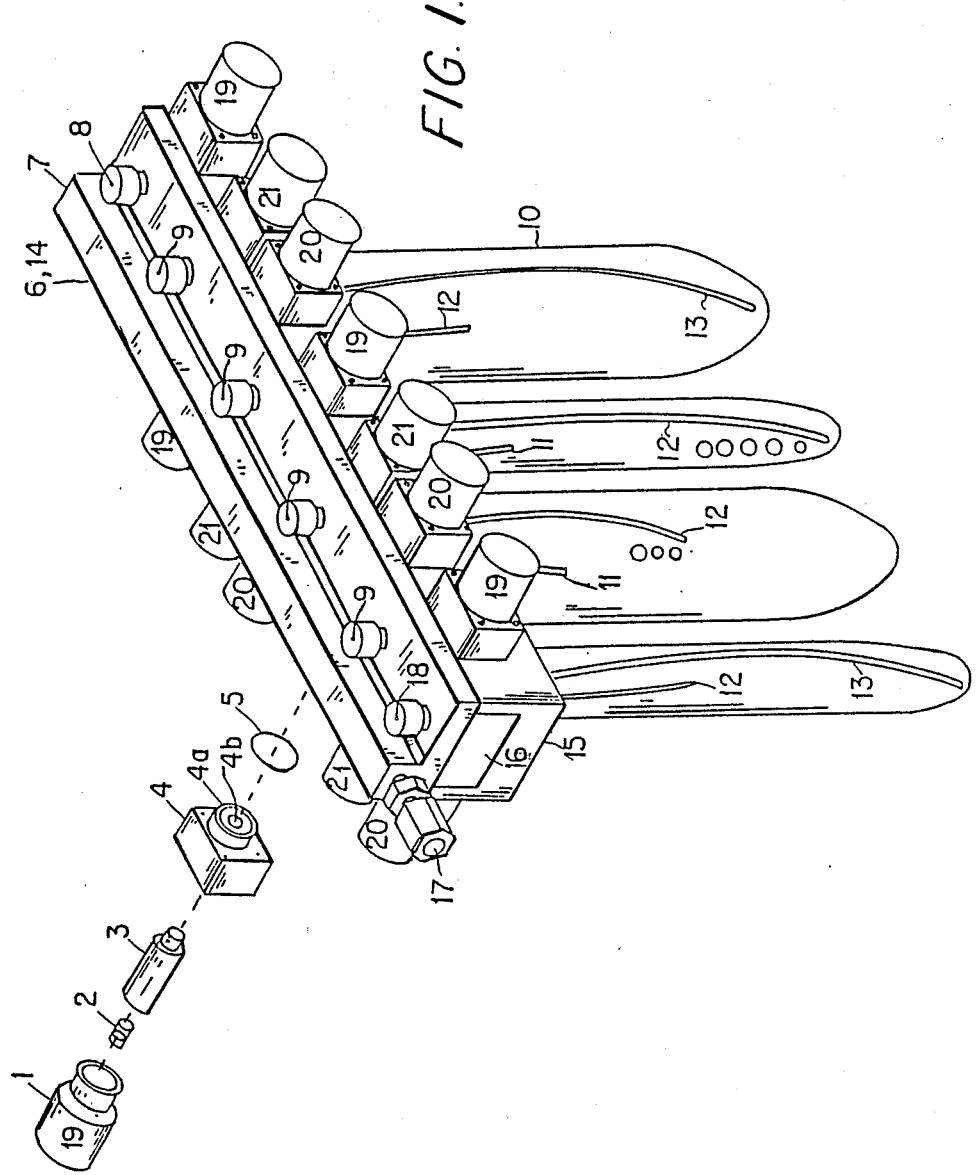

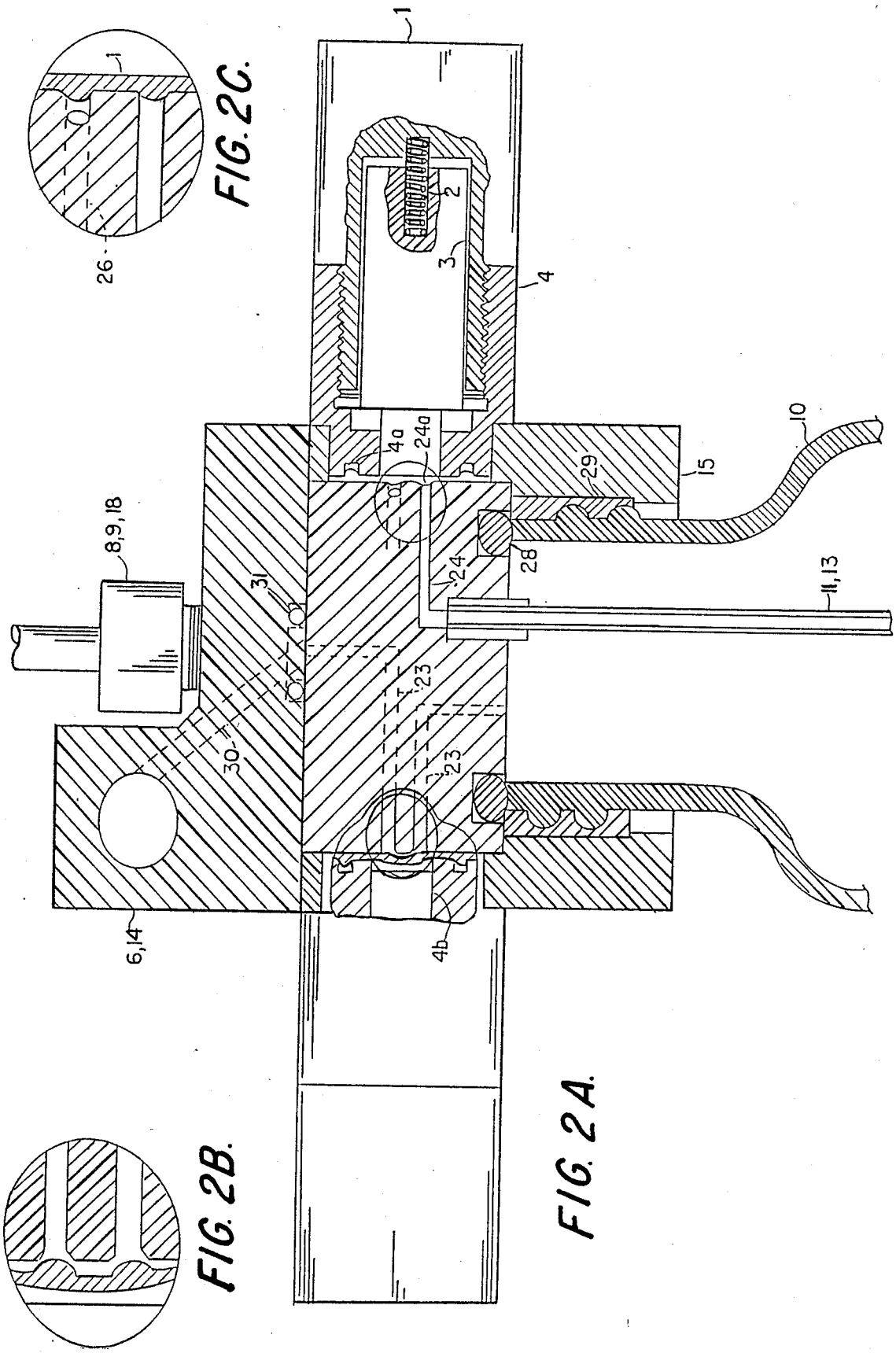

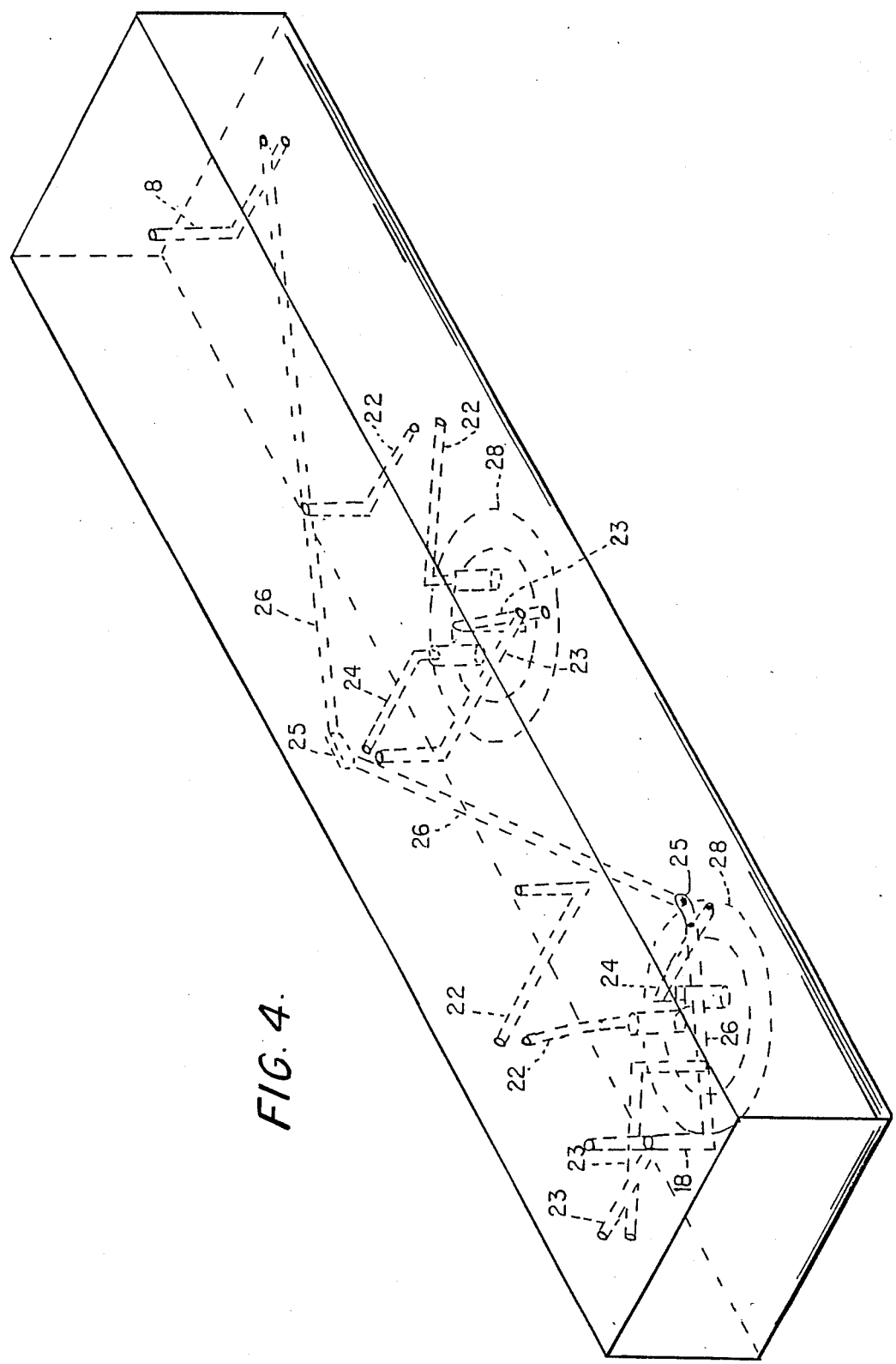

VALVE BLOCK ASSEMBLY

RELATED APPLICATION

This application is a continuation-in-part of Ser. No. 901,327, filed Aug. 27, 1986, now U.S. Pat. No. 4,773,446, incorporated by reference herein. Priority is claimed pursuant to 35 U.S.C. 120.

BACKGROUND OF THE INVENTION

This invention relates to a valve block assembly of the kind having multiple inlets and a single outlet. Such assemblies find particular application in protein sequencers.

Automated chemistry instrumentation has traditionally used many subsystems to accomplish fluid handling. These subsystems include valving, tubing, tubing connectors, manifolds and fluid reservoirs. Many times, the type of chemistry used in these external sources is sensitive to contamination from internal or external sources so it is critical to design the instrument so that contamination is eliminated or minimized. For example, in the chemistry used in protein sequencers, the so-called Edman degradation, it is extremely important to exclude oxygen from the reaction. The Edman degradation consists of two principal chemical reactions called the coupling reaction and the cleavage reaction. During the coupling reaction, phenylisothiocyanate (PITC) reacts with the protein amino groups in the presence of a base to form a phenylthiocarbamyl (PTC) derivative of the amino-terminal amino acid. The cleavage reaction results in the anilinothiazolinone (ATZ) derivative of the amino terminal amino acid being formed as it is cleaved from the protein chain. The PTC group is extremely sensitive to desulfurization by oxidation so it is imperative that the reaction be performed in the absence of oxygen. If the PTC group is oxidized, the degradation will halt because the ATZ cannot be formed.

To overcome the problem of oxygen contamination, it has become common practice to flush the reaction chamber with an inert gas such as nitrogen or argon. While this helps keep the chamber atmosphere oxygen free, it does not prevent oxygen from entering the reaction chamber as a dissolved gas in the reactants themselves. Since the chemicals used in the Edman degradation are also very corrosive, all tubing in the fluid-handling system must be chemically inert. Unfortunately, the tubing, although extremely resistant to attack by the Edman chemicals, is also very porous to the oxygen in the atmosphere and the chemicals become contaminated by the diffusing oxygen.

Previous protein sequencers have used tubing to connect remote delivery valves, pressure valves and venting valves to chemical reservoirs with the result that oxygen sensitive chemicals are directly exposed to the diffusing oxygen, not only in the tubing, but also in the reservoirs. There is a direct pathway from the atmosphere through the tubing to the contents of the reservoir from the exposed tubing. To help overcome this problem, it has been a common practice to add reducing agents to all of the chemical reservoirs. While this seems to help significantly, it is not an ideal solution to the problem. The reducing agents contribute spurious components which may interfere with the analysis of the amino acid derivative produced by the sequencer. Also, the antioxidizing effect of the reducing agents is relatively short-term. If the chemicals in the tubing are exposed for a period of days, as in the case of an idle instrument, the chemical must be replaced for the performance of the Edman degradation is greatly compromised.

Another source of oxygen contamination is leaking at the junctions between connecting tubing and other components of the fluid-handling system. Previous fluid handling systems have made extensive use of individual components connected through tubing. Every connection represents a potential source of trouble, not only from oxygen contamination but from poor performance due to variable flow rates in a leaking system. Also, since these chemicals may be corrosive or poisonous, a leak represents a hazard to operators and to the instrument itself.

Wittman-Liebold, U.S. Pat. No. 4,008,736 describes a valve arrangement in which a common conduit is formed in the valve block. All delivery valve sites lie on the same surface and are connected by zig-zagging portions of the conduit. While this type of common conduit may be cleaned by flushing, it cannot be cleaned easily with a wire. It is also difficult to machine.

Graffunder, U.S. Pat. No. 4,168,724 replaced the slider valves of the '736 patent with diaphragm valves. These valves are close by fluid pressure in an actuator chamber adjacent to the diaphragm, and opened by evacuating the chamber. The zigzag sections of the common conduit intersect at the surface of the valve block. All delivery valve sites lie on the same surface.

This apparatus has several disadvantages. First, it is necessary to provide vacuum and high pressure sources. Second, the diaphragm has a tendency to cold flow into the common conduit at the point of intersection, requiring that it be moved a greater distance in order to open the valve. This in turn places greater demands on the evacuation system, and increases the wear and tear on the diaphragm.

Hunkapiller, U.S. Pat. No. 4,558,845 replaces the zig-zag sections of Wittman-Liebold with straight sections which are easier to clean and to machine. However, each valve site is placed on a separate block, and the common conduit is alternately a channel in a block and tubing exposed to the atmosphere.

Hunkapiller also replaced Wittmann's actuation mechanism with a plunger that is spring-biased to a closed position. A solenoid device is used to draw the plunger to an open position. Since Hunkapiller retains the narrow access port of the previously described apparatus, his valve is likewise subject to the problem of membrane "cold flow".

SUMMARY OF THE INVENTION

This invention is directed to an integrated fluid-handling system which avoids the undesirable features of prior devices. All of the subsystems normally found in previous systems have been integrated into one compact unit with the result that most of the tubing and connectors in prior devices have been eliminated.

The only exposed tubing leads from the gas regulators to the block assembly and from the valve block assembly to the receiving vessel (reaction chamber). This reduces the exposure of sensitive chemicals to oxygen diffusing through the walls of exposed tubing or leaking in where the tubes are joined to other structures. In protein sequencers, delivery rates are low, so a particular reactant may be exposed to diffusing oxygen for hours before moving to the reaction chamber. Much of the pressurizing and venting conduits for maintaining an inert atmosphere of appropriate pressure in the reservoirs is in the form of channels within the block. That part which s tubing is, with the aforestated exceptions, disposed within the controlled atmosphere of the reservoirs themselves.

In contrast, prior apparatus make heavy use of tubing, which is vulnerable to atmospheric attack. See Wittman, U.S. Pat. No. 3,959,307; Hood, U.S. Pat. No. 4,252,769.

To summarize, the present integrated system alleviates many of the problems associated with automating the delivery of sensitive chemicals to a reaction chamber. By locating the delivery conduits and connectors within the controlled atmosphere of the chemical reservoir or within the valve block itself, exposure of the chemicals to diffusing oxygen is eliminated. The advantages of this approach include greater efficiency of chemical reactions which are poisoned by oxidation of the reactants and a much simpler and more reliable fluid-delivery system.

The common outlet conduit is composed of surface grooves at the valve sites and linear connecting sections which are open to the surface at both ends. Thus, each section may be easily cleaned by passing a wire through the section. Also, these linear sections are easier to form than the zigzag sections of prior devices.

The grooves are less readily blocked by cold flowing of the diaphragm of the valve than is the narrow port of the prior devices.

If the side walls of the grooves diverge as they approach the surface, only a slight movement of the diaphragm away from the groove is needed to open fluid communication between the groove and the delivery port at each valve site. The exit hole of the adjacent delivery channel preferably has a conical or frusto-conical shape for similar reasons. Since only a slight separation of the diaphragm is needed, vacuum is not essential to valve operation.

Since each valve has its own diaphragm, the diaphragm may be selected of a material which is appropriate for containing the contents of the corresponding reservoir, and the diaphragm itself may be kept small.

The solenoid-holding block preferably has a two-tier design that reduces compressive forces on the valve block.

The upper tier holds the solenoid and the lower tier presses against the membrane. Compressive forces are mainly absorbed by the membrane rather than by the valve block. The lower tier also provides the plunger guide hole.

The lower tier compresses the periphery of the diaphragm, so that, absent other forces, the center would bulge into the plunger guide hole. The plunger is spring-biased to compress the center of the diaphragm. When the plunger is withdrawn by the solenoid, the center of the diaphragm springs back to the bulging position.

The lower tier of the solenoid-holding block preferably has a relief groove into which the membrane may "cold flow". Without this feature, the membrane may "cold flow" into the plunger hole, the delivery channel and the common channel, thereby impairing the operation of the valve.

Other advantages of the present valve block design will be apparent from the following description, claims, and drawings.

BRIEF DESCRIPTION OF THE DRAWINGS

FIG. 1 shows an isometric view of the valve block assembly.

FIG. 2 is a sectional view of the valve block assembly.

FIG. 4 is an isometric view of the interior of the valve block assembly, illustrating the various channels.

DETAILED DESCRIPTION OF THE INVENTION

Figure 3A:
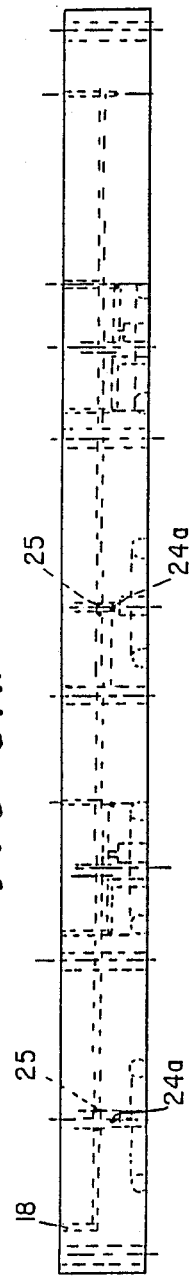
FIG. 3 is a series of plan views (3A, 3B, 3C) of the valve block.
Figure 3B:
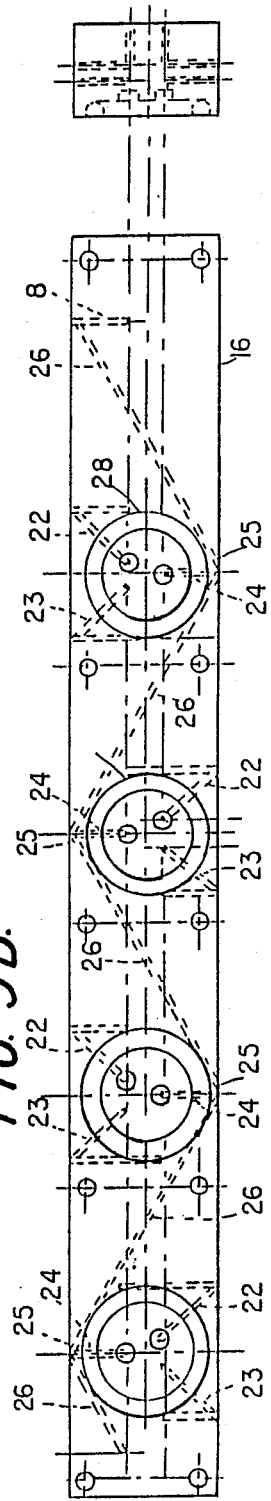
Figure 3C:
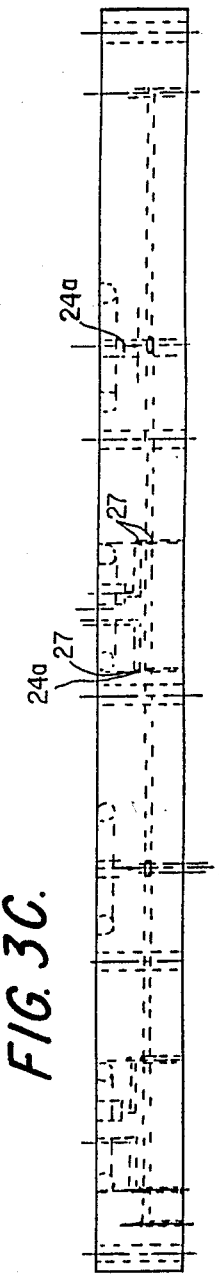

In a preferred embodiment, the valve block has two delivery valve surfaces, best seen in FIG. 3. At least one valve site is provided on each surface. The valve block provides a plurality of inlets and a common outlet. At each valve site one finds an inlet channel 24, and an access to the common channel running to common outlet 18. The access is in the form of a groove 25 on the valve surface. The common channel connects each valve site to a valve site on the other valve surface. Linear channel sections 26 connect the groove 25 of one valve site to the groove of the next valve site on the other surface.

Since channel sections 26 are linear, and are open to both valve surfaces, they may be cleared of any obstruction by running a fine wire through the section. Moreover, these sections do not present the problem of a dead volume interior to the valve block.

As seen in FIG. 1, fluid reservoirs 10 may be connected to the valve block 16. These supply fluids (gases and liquids) by tubing 11 and 13, respectively to delivery channels 24, as shown in FIG. 2. Each delivery (feeder) channel communicates with one valve site at output end 24a. This output end 24a is spaced apart from the open groove 25.

A diaphragm valve 19, 20, 21 is disposed at each valve site. When the valve is closed, diaphragm 5 is pressed against output end 24a and open groove 25, so fluid cannot pass out of the delivery channel and into the common channel. However, the diaphragm merely covers and does not plug the groove, so fluid already in the common channel but upstream of the valve may flow through the groove and on downstream. Opening delivery valve 19 allows pressurized fluid from channel 24 to leak into groove 25. Preferably, the groove has a "V-shaped" or "rounded V-shaped" cross-section, so that only a small movement of the diaphragm is needed to permit this flow.

The solenoid-holding block 4 is internally threaded to accept a standard solenoid 1. The unusual two-tiered design allows these blocks to be secured directly to the aluminum cradle 15 surface with screws through the upper tier. The lower cylindrical tier extends inside the aluminum cradle 15 to make the seal at the valve block 16 surface by pressing against the captive membrane 5. This design also ensures precise alignment of the solenoid plunger 3 over the channel entry/exit holes 25,24 in the valve block 16 because the cylindrical lower tier can be made perfectly concentric with the plunger guide hole 4b.

Another advantage of this two-tiered design is that the solenoid-holding block 4 never comes into direct contact with the valve block 16 material. This is very important because valve blocks are made from chemically resistant thermoplastics which all cold-flow when subjected to mechanical stress. A design which puts any part of a solenoid-holding block directly on the plastic can change the mechanical properties of the valve, especially if the plastic material is heated or exposed to chemicals which even mildly attack it.

In our design, the only thing under compression in this critical area is the membrane seal 5 so negligible mechanical stress is placed on the valve block material 16 A controlled amount of compressive force can be applied to this membrane 5 by machining the solenoid-holding block 4 lower tier to the appropriate length. For example, if the membrane 5 is 0.020" thick and the lower tier extends to within 0.015" of the valve block 16 surface, 0.005" compression is applied when the solenoid-holding block 4 is secured into position.

Figure 5B:
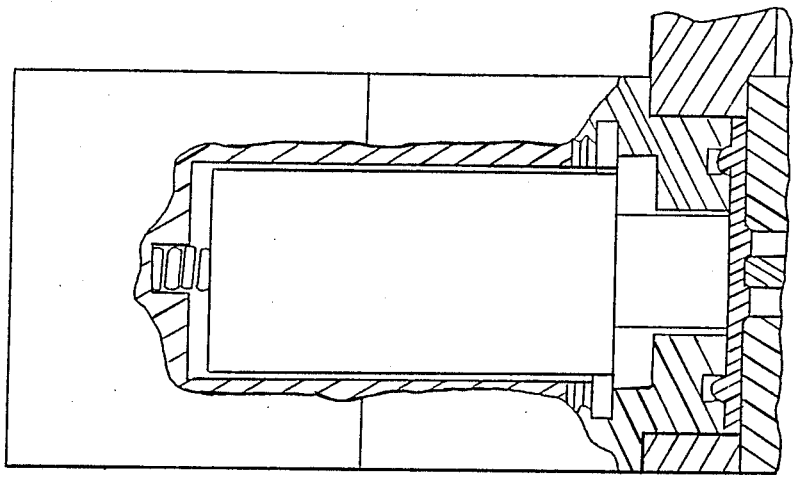
FIG. 5 is a view of the valve means with the relief groove (5B), as compared to a view of a conventional valve (5A) without such a groove.
Figure 5A:
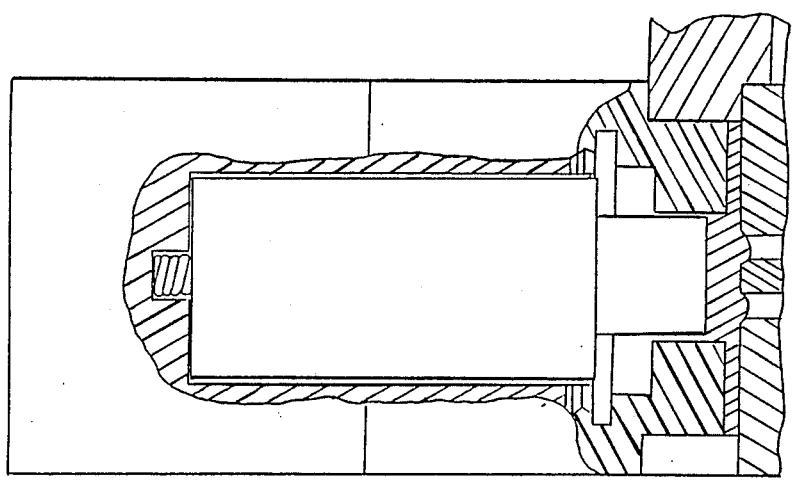
Figure 6F:
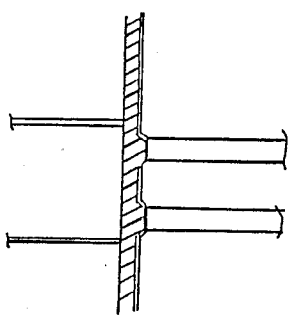
FIG. 6 is a series of side and end views of the present valve means and a conventional valve means, in open and closed positions, as follows: conventional system—valve closed, side view (6A), valve closed, end view (6B), valve open, end view (6C); present invention—valve closed, side view (6D), valve open, end view (6E), valve closed, end view (6F).
Figure 6C:
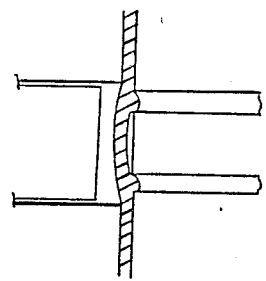
Figure 6E:
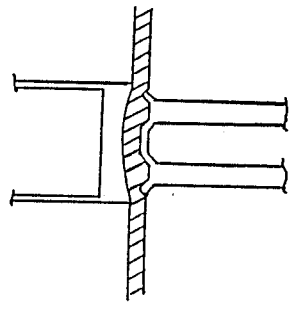
Figure 6B:
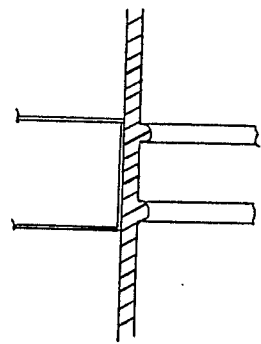
Figure 6D:
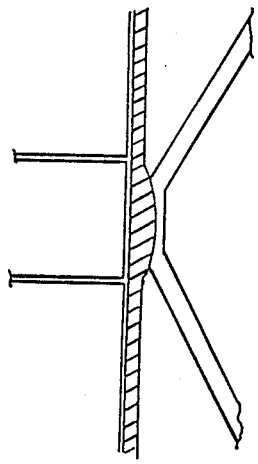
Figure 6A:
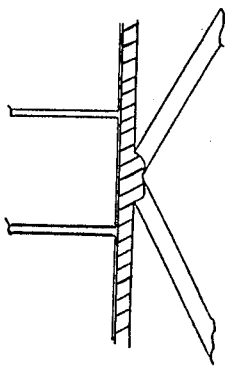

The relief groove 4a in the lower tier surface accommodates membrane material 4 which would otherwise coldflow into the plunger guide hole 4b. If too much material flows into the plunger guide hole 4b, it will overcome the plunger spring 2 force and jam the plunger 3 upwards, preventing the valve from working (see FIG. 5).

While this recess is preferably in the form of a groove, it may take other forms which provide a relief volume into which the stressed diaphragm may flow.

A controlled amount of deformation is desirable since excess material within the plunger guide hole 4b acts as a spring and helps the membrane 5 lift. The relief groove 4a, while not essential, is preferred because it prevents overcompression of this material. The ideal balance is calculated by adjusting the parameters of membrane compression and relief groove 4a internal volume for a given guide hole 4b diameter.

The self-assisting action of the membrane is one key element in reliable valve operation The entire solenoid-holding block 4 is designed to take advantage of this self-assisting action. Previous zero-dead-volume designs have required either a vacuum/pressure or vacuum/spring membrane actuation for reliable operation. Our design takes advantage of the energy stored in the compressed membrane to help lift it from the sealing surface. This is extremely important since it allows us to do away with awkward and expensive vacuum systems to "assist" the valves. In addition, it makes for a much less complicated solenoid/plunger arrangement since it does not have to be vacuum-tight.

Also, all channels at or terminating at the valve block 16 sealing surfaces are countersunk 27 so that a conical or V-shaped depression is formed at the surface. This allows a good seal and ensures that cold flow of the membrane 5 into the valve channel openings will form complementary conical or V-shaped protrusions which will move out of the channel easily when the valve is actuated. Without the conical or V-shaped countersink, the membrane 5 will cold-flow in a cylindrical shape and effectively plug the channel. This cylindrical plug must lift entirely out of the channel before fluid can flow because the internal surfaces of the valve channel and the membrane plug cannot separate. The conical or V-shape formed by our design will allow fluid to flow as soon as the membrane moves because the two surfaces will instantly separate (see FIG. 6).

The fluid reservoirs attach directly to a valve block assembly which contains the valving and internal channeling to control flow from reservoir to reaction chamber as well as pressurization and venting of the reservoirs. Also included is the channeling to a venting manifold.

All tubing which contains fluid from the reservoirs located within the reservoir itself or within the valve block's internal channels. The valve controlling the flow of this fluid is part of the assembly which receives the reservoir and communicates with the reservoir only through channels internal to the valve block assembly. This arrangement leaves no way for atmospheric oxygen to enter the system by diffusion through porous tubing.

Likewise, the two other valves in the system, the reservoir pressurization valve and the reservoir venting valve, are mounted directly on the valve block assembly. The pressurization valve communicates with the reservoir only through channels within the valve block or tubing contained within the reservoir. The tubing needed to bring pressurized gas from a regulator to the valve may be of a nonporous material such as steel or aluminum since only inert gas flows into the tubing. Even if this tubing is porous, when the pressurization valve is closed there is no pathway for diffusing oxygen to reach the reservoir. Any oxygen which has entered the gas line may be purged out of the system by merely opening the pressure and vent valves simultaneously for a short time before delivery of the fluid to the reaction chamber.

The venting valve communicates with the reservoir through a channel within the valve block assembly. The valve communicates with the vent manifold in a similar manner. Part of the upper aluminum cover of the valve block assembly also serves as the vent manifold which mates directly to the valve block through O-ring seals. A channel within the upper cover provides a route from the valve block to the manifold. The manifold is continually flushed with an inert has so that even when the vent valve is open, there is no way for oxygen to enter the system.

The reaction chamber which receives the chemical reactants from the fluid reservoirs may be mounted directly on the valve block assembly or remotely connected through a single piece of tubing. If the reaction chamber is to be heated, a remote configuration is preferred so that good temperature isolation is maintained between the fluids in the reservoirs and the reaction chamber. In practice, the single piece of connecting tubing between the valve block assembly and the reaction chamber does not represent a serious compromise in the design since fluids are moving through this conduit and are never exposed to diffusing oxygen for extended periods of time. The tubing and the reaction chamber are always flushed with inert gas before fluids from the reservoirs enter the tubing. A protein sequencer is an example of an instrument which might use this design.

If the reaction chamber is to be maintained at room temperature, it may be connected directly to the valve block assembly through a sealing structure not exposed to the atmosphere. This may be the case in a DNA synthesizer, for example, where a heated chamber is not necessary but ultralow exposure of oxygen to the chemicals is also critical.

All chemically-resistant tubing which contains the reactant fluids is located within the inert atmosphere of the reservoirs. Connection of this tubing to the valve block is made by stretching one end of the tubing slightly to decrease its diameter then pulling the tubing through a cylindrical fitting with a hole slightly smaller than the diameter of the unstretched tubing. The tubing is pulled through this hole until the unstretched portion makes a gas-tight interference fit. The excess tubing protruding from one end of the fitting is cut flush and the tubing protruding from one end of the fitting is cut to length suitable for insertion into the chemical reservoir. A hole of appropriate diameter is countersunk directly into the valve block channel and the fitting is pressed in.

The tubing 11 and 13 in the reservoirs 10 are exposed only to a controlled atmosphere. When pressure valves 20 are opened, inert gas enters the valve block at inlets 9 and directed through channels 22 into the tubing 12 of reservoirs 10. Excess gases are vented through channels 23 in vent manifold when vent valves 20 are opened. The gases vented, which may be noxious, are routed to one or more vents and removed from the apparatus. Inert O-rings 28 on the bottom of valve block 16 provide a gas-tight-seal where the reservoirs 10 are screwed into inert bottle caps 29 of lower aluminum cradle 15 of the block 16.

While, preferably, a single inert atmosphere is supplied to all reservoirs, it is possible to provide different reservoirs with different gases. Also, it is possible to eliminate tubing 12 and permit the channels 22 to communicate directly with reservoirs 10.

Numerous modifications will be apparent to those of ordinary skill in the art. The tube leading from the gas regulators may be made of nonporous metal. The tubing running from the valve block assembly to the reaction chamber may be eliminated by mounting the reaction chamber on the valve block assembly. (A detached reaction chamber is, however, easier to heat.

Figure 7B:
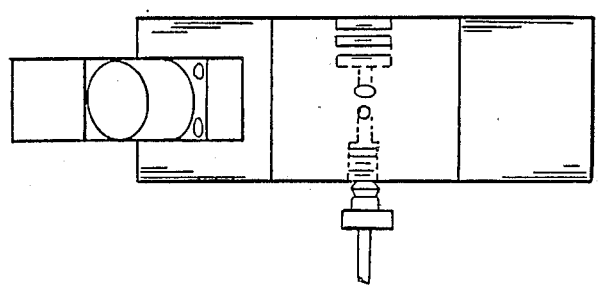
FIG. 7 is a plan (7A) and side view (7B) of a second embodiment of the valve block assembly.
Figure 7A:
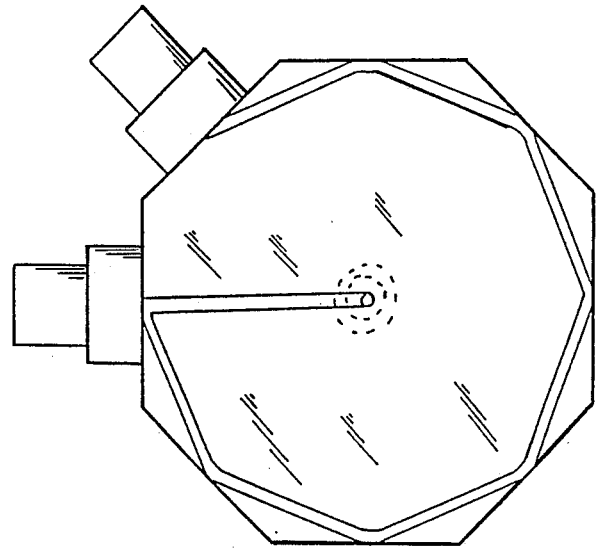

In another embodiment (FIG. 7), the valve body provides more than two valve surfaces. As diagrammed, the valve body is octagonal, with each of the eight sides providing a valve site. The common channel comprises a series of linear intervalve sections, each section running from one side to an adjacent side. It terminates in a section running from the final valve site to the center, where an axial outlet channel is located. At each valve site, one may provide connecting grooves as taught above, or provide intervalve sections which intersect at the valve surface as taught by Hunkapiller.

In another modification, the common channel of the valve block is provided with a common inlet "upstream" of the feeder channels. This inlet may be helpful in a number of respects. First, it can be used to introduce a fluid which will clean or dry the common channel. Second, the common outlet of one valve block could be connected to the common inlet of another. If desired, this inlet may be valved.

What is claimed:

1. A valve system comprising at least two valve block assemblies, said valve block assemblies isolating from contamination and selectively dispensing reactive fluids for protein or peptide sequencing comprising:
  (a) one or more removable gas-tight, reservoir means capable of holding reactive fluids, wherein said reservoir means is formed of a material essentially impermeable to oxygen, and wherein the atmosphere provided to said reservoir is essentially oxygen-free;
  (b) collection means for selectively collecting fluids from said reservoir means, said collection means comprising a valve block having channels defined therein; and
  (c) means for controlling the atmosphere in said reservoir means; wherein said valve block assembly provides a common channel having a single outlet, and one or more feeder channels, and valve means for each feeder channel, each feeder channel connecting a reservoir means to said common channel when the respective valve means is open; and wherein the common outlet of one valve block assembly is connected to a common inlet of another such valve block assembly.

* * * * *